United States Patent
Stephens

(10) Patent No.: US 9,318,894 B2
(45) Date of Patent: Apr. 19, 2016

(54) METHODS OF OPERATING DUAL FED SYSTEMS

(75) Inventor: Richard Ian Stephens, Warwickshire (GB)

(73) Assignee: GE Energy Power Conversion Technology, LTD., Rugby, Warwickshire (GB)

( * ) Notice: Subject to any disclaimer, the term of this patent is extended or adjusted under 35 U.S.C. 154(b) by 250 days.

(21) Appl. No.: 13/882,212

(22) PCT Filed: Oct. 25, 2011

(86) PCT No.: PCT/EP2011/068649
§ 371 (c)(1),
(2), (4) Date: Jun. 12, 2013

(87) PCT Pub. No.: WO2012/059366
PCT Pub. Date: May 10, 2012

(65) Prior Publication Data
US 2015/0035286 A1    Feb. 5, 2015

(30) Foreign Application Priority Data
Nov. 3, 2010 (EP) .................................... 10014234

(51) Int. Cl.
*F02D 25/00* (2006.01)
*H02J 4/00* (2006.01)
(Continued)

(52) U.S. Cl.
CPC . *H02J 4/00* (2013.01); *B63H 21/22* (2013.01); *B63H 23/24* (2013.01); *B63H 25/42* (2013.01); *H02J 3/38* (2013.01)

(58) Field of Classification Search
CPC .............. B63H 21/20; H02J 3/38; H02J 9/06; Y02T 10/6221; Y02T 10/6286
USPC ................................................... 290/4 C, 4 R
See application file for complete search history.

(56) References Cited

U.S. PATENT DOCUMENTS 4,808,835 A   2/1989 Tsuji
5,424,958 A   6/1995 Knupp
(Continued)

FOREIGN PATENT DOCUMENTS

DE    2008022077 A1   11/2009
EP       0730333 A2    9/1996
(Continued)

OTHER PUBLICATIONS

Unofficial English Translation of Chinese Office Action issued in connection with corresponding CN Application Na 201180052067.4 on Dec. 2, 2014.

*Primary Examiner* — Tulsidas C Patel
*Assistant Examiner* — Thomas Quigley
(74) *Attorney, Agent, or Firm* — Parks Wood LLC

(57) ABSTRACT

A method of operating a dual fed system is described where power is supplied to a electrical load from first and second ac busbars at a ratio that achieves a desired level of exhaust emissions such as nitrogen oxides ($NO_x$), carbon dioxide ($CO_2$) and other pollutants produced by the prime movers associated with generators. Preferably, the method may be used to operate a dual fed marine propulsion system wherein the electrical load is a thruster. Operating a dual fed marine propulsion system using the method of the present invention makes it possible to optimize thrust allocation between thrusters in a way that is similar to that used in conventional dynamic positioning (DP) systems and then share or allocate the required power between generators to minimize exhaust emissions.

19 Claims, 5 Drawing Sheets

(51) Int. Cl.
*B63H 21/22* (2006.01)
*B63H 23/24* (2006.01)
*B63H 25/42* (2006.01)
*H02J 3/38* (2006.01)

(56) References Cited

U.S. PATENT DOCUMENTS

2003/0111907 A1 6/2003 Tange et al.
2008/0021675 A1* 1/2008 Fehr .................. G06Q 10/04
 702/182
2009/0156068 A1 6/2009 Barrett
2010/0284117 A1* 11/2010 Crane .................... 361/93.1

FOREIGN PATENT DOCUMENTS

JP 2009183064 A 8/2009
JP 2010213420 A 9/2010

* cited by examiner

METHODS OF OPERATING DUAL FED SYSTEMS

FIELD OF THE INVENTION

The present invention relates to methods of operating dual fed systems with local generation. The methods of the present invention are particularly suitable for operating dual fed marine propulsion systems that employ active front end (AFE) power converters and which can be installed in any suitable marine vessel, either civilian or military.

BACKGROUND OF THE INVENTION

There are many dual fed systems with local generation. Typically, these systems comprise a first busbar, a second busbar, at least one generator connected to the first busbar and having an associated prime mover, at least one generator connected to the second busbar and having an associated prime mover, and an electrical load connected to the first busbar by means of a first power converter and connected to the second busbar by means of a second power converter. Such dual fed systems may operate with alternating current or direct current depending upon the specific system.

Possible applications of dual fed system include industrial works that have local power generation, for example steel works. The electrical loads of these systems may comprise any or all mechanical operations of the works including, but not limited to, water pumps, fans, gas compressors, electric arc furnaces, rolling mill drives and crane drives. Another possible application of a dual fed system is a mine with local power generation wherein the electrical loads may be hoists, conveyers, crushers, fans or any other equipment of the mine.

One example of a dual fed system with local generation is the propulsion system of some marine vessels. These systems operate with alternating current. The electrical loads of the systems are the thrusters of the vessel. Generally, such propulsion systems are operated by dynamic positioning systems.

Dynamic positioning (DP) of marine vessels relies on the use of thrusters to maintain the position of a vessel in the vicinity of a reference point and stabilise its heading, in opposition to environmental forces such as wind and current. The object of a DP system is not to hold the vessel absolutely stationary, but to maintain its station within acceptable limits. The term "dynamic positioning (DP) system" is intended to include other positioning systems for vessels such as position mooring systems and thruster-assisted mooring systems which combine aspects of a DP system with a mooring system.

In a typical DP system the thrust demands from a controller are allocated to the available thrusters according to some definition of optimality. For example, thrust demands may be allocated to achieve minimum total power usage by sharing thrust in proportion to the rated power of each thruster. In a marine propulsion system the thrusters will be connected to ac busbars that receive power from ac generators that are coupled to prime movers, typically diesel engines or gas turbines that produce environmentally harmful exhaust gases such as nitrogen oxides ($NO_x$), carbon dioxide ($CO_2$) and other pollutants related to the combustion process.

Selective catalytic reduction (SCR) is a means of converting nitrogen oxides with the aid of a catalyst into nitrogen ($N_2$) and water ($H_2O$). A gaseous reductant, typically anhydrous ammonia, aqueous ammonia or urea, is added to a stream of flue or exhaust gases and is absorbed onto a catalyst. Carbon dioxide is a reaction product when urea is used as the reductant. Under the right preconditions, SCR is capable of eliminating over 85% of the nitrogen oxides produced during diesel engine combustion. In the hot exhaust gases the urea solution decomposes to ammonia and carbon dioxide in the following reaction:

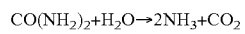

$$CO(NH_2)_2 + H_2O \rightarrow 2NH_3 + CO_2$$

The ammonia converts the nitrogen oxides in the exhaust gases to nitrogen and water vapour in the following reaction:

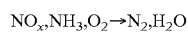

$$NO_x, NH_3, O_2 \rightarrow N_2, H_2O$$

An unwanted secondary reaction produces sulphur trioxide ($SO_3$) and ammonium sulphates from sulphur in the fuel. It is important to maintain the temperature of the exhaust gases at a level which prevents the deposits of sulphates which can "mask" the catalyst and adversely affect the $NO_x$ conversion efficiency of the SCR system. It is therefore common for diesel engines to include a bypass feature which means that when the generator that is coupled to the diesel engine is operating at low power compared to rated power a significant proportion of the exhaust gases bypass the SCR system and the $NO_x$ emissions per kilowatt-hour are increased.

Production of carbon dioxide by diesel engines or gas turbines is dependent on engine efficiency; where efficiency can be considered to be the ratio of the electrical energy output from an associated electrical generator and the calorific value of the fuel that is consumed by the diesel engine or gas turbine. At low efficiencies more carbon dioxide will be produced per kilowatt-hour of energy output. It is therefore advantageous to operate diesel engines and gas turbines at high efficiency to minimise carbon dioxide emissions.

Sharing thrust in proportion to the rated power of each thruster does not necessarily achieve minimum $NO_x$ emission during operation of the DP system ("Reducing $NO_x$ emissions in DP2 and DP3 operations", B. Realfson, DP Conference, 13-14 Oct. 2009, Houston, Tex.). One way of reducing $NO_x$ emissions is to share the thrust between isolated busbar sections of the marine propulsion system to load up some generators (and hence load up the coupled diesel engine) and unload others according to the predicted emission rates. Although this reduces $NO_x$ emissions it increases the total power usage. FIG. 1 shows a prior art marine propulsion system where thrusters T1-T4 are connected to ac busbars 30a, 30b that are interconnected by a tie 32. A pair of ac generators G1, G2 are driven by associated diesel engines D1, D2 and supply ac power to the first ac busbar 30a. A pair of ac generators G3, G4 are driven by associated diesel engines D3, D4 and supply ac power to the second ac busbar 30b. Each thruster T1-T4 is connected to a single ac busbar by means of an associated power converter 34 that has a diode front end (i.e. a pair of passive rectifiers) and transformers. In order to alter the power taken from any of the generators G1-G4 along the lines suggested above then the ac busbars 30a, 30b must be isolated by opening the tie 32 and the thrust allocated to each thruster T1-T4 must be altered. As mentioned above, the minimum power solution for thrust allocation requires that thrust is shared in proportion to the rated power of each thruster and this is not possible in the marine propulsion system of FIG. 1.

FIG. 2 shows an alternative prior art marine propulsion system that is similar to the marine propulsion system of FIG. 1 but each thruster T1-T4 is now connected to two ac busbars. More particularly, a first passive rectifier 36 associated with each thruster is connected to the first ac busbar 30a and a second passive rectifier 38 is connected to the second ac busbar 30b. The ac busbars 30a, 30b are interconnected by a tie 32 which includes an inter-bus transformer 40 that provides a phase shift. The phase shift between the ac busbars allows the passive rectifiers 36, 38 to operate in 12-pulse mode, i.e. there are 12 voltage pulses from commutation of the diodes for each cycle of the ac supply voltage. However, the diode front end of each power converter 34 still does not allow control of the amount of power that is supplied by each ac busbar. Power sharing or allocation is dependent on the natural commutation of the passive rectifiers 36, 38 and will almost always share power equally from the first and second ac busbars 30a, 30b.

An improved dual fed marine propulsion system that employs active front end (AFE) power converters is shown in FIG. 3. The marine propulsion includes a first ac busbar 2a and a second ac busbar 2b. The first and second ac busbars 2a, 2b may carry a low voltage (LV) supply voltage (e.g. 690 V) and may optionally be divided into separate individual sections.

A pair of ac generators G1, G2 are driven by associated diesel engines D1, D2 and supply ac power to the first ac busbar 2a. A pair of ac generators G3, G4 are also driven by associated diesel engines D3, D4 and supply ac power to the second ac busbar 2b. The generators G1-G4 are connected to the respective ac busbar by protective switchgear 4 with circuit breakers and associated controls or other switching means. It will be readily appreciated that the marine propulsion system may have any suitable number of ac generators and any suitable busbar configuration depending on the power generation and distribution requirements.

The ac busbars 2a, 2b may be interconnected by a tie 6.

The marine propulsion system includes a series of four parallel propulsion drive systems 22a-22d. Each propulsion drive system includes a thruster T1-T4 connected in parallel to the first and second ac busbars 2a, 2b by AFE power converters 8, 10 and associated harmonic filter systems 12. More particularly, a first AFE power converter 8 is connected between each thruster and the first ac busbar 2a and a second AFE power converter 10 is connected between each thruster and the second ac busbar 2b as shown in FIG. 3. Each AFE power converter includes a first active rectifier/inverter 14 (or 'front end' bridge) having ac input terminals connected to the respective ac busbar 2a, 2b and a second active rectifier/ inverter 16 having ac output terminals connected to the thruster. The thruster is therefore connected to the ac output terminals of the second active rectifier/inverter 16 of each associated AFE power converter 8, 10 in parallel. The dc terminals of the first and second active rectifier/inverters 14, 16 for the first AFE power converter 8 are connected together by a dc link 18 and the dc terminals of the first and second active rectifier/inverters 14, 16 for the second AFE power converter 10 are connected together by a different dc link 18.

The ac input terminals of each first active rectifier/inverter 14 are connected to the associated ac busbar 2a, 2b by protective switchgear 20.

Although only shown for the first propulsion drive system 22a, the ac output terminals of each second active rectifier/ inverter 16 are connected to the associated thruster T1-T4 by fast-acting isolation contactors 24 that are an optional feature. The first and second AFE power converters 8, 10 are also short circuit proof with the ability to shutdown safely and automatically in the event of a short circuit at their ac terminals.

In normal operation, the first active rectifier/inverter 14 will operate as an active rectifier to supply power to the dc link 18 and the second active rectifier/inverter 16 will operate as an inverter to supply power to the thruster, but reverse operation may be possible in certain circumstances such as regenerative braking where power is supplied from the thruster (operating as a generator) back to the ac busbars 2a, 2b.

Each active rectifier/inverter 14, 16 may typically have a conventional three-phase two-level topology with a series of semiconductor power switching devices (e.g. IGBTs) fully controlled and regulated using a pulse width modulation strategy. However, in practice the active rectifier/inverters can have any suitable topology such as a three-level neutral point clamped topology or a multi-level topology, for example.

Additional ac busbars may be connected to ac busbars 2a, 2b by transformers so that the distribution voltages carried by the additional ac busbars are conveniently derived by transformer action. The additional ac busbars may be used to provide power to other electrical loads.

The thrusters T1-T4 may be of any suitable type and construction and are configured to drive a propeller shaft (not shown).

FIG. 4 shows an alternative marine propulsion system. The basic overall arrangement is similar to the marine propulsion system of FIG. 3 and like parts have been given the same reference numerals. The marine propulsion system includes two main thrusters (or larger propulsion motors) T1, T2 typically rated at 3.5 MW each and two smaller maneuvering thrusters T3, T4 which are particularly suitable for DP and are typically rated at 1.2 MW each. Each thruster T1-T4 is connected to first and second busbars 2a, 2b by AFE power converters as described above. During transit of the marine vessel the maneuvering thrusters T3, T4 are not required and the main thrusters T1, T2 receive power from the first ac busbar 2a by means of the AFE power converters 8a, 8b and 8c, 8d and from the second ac busbar 2b by means of the AFE power converters 10a, 10b and 10c, 10d. In other words, each of the main thrusters receives power from four AFE power converters, two being connected to the first ac busbar 2a and two being connected to the second ac busbar 2b. For DP operation the main thrusters T1, T2 will not require full power and can therefore receive power from any two of the four associated AFE power converters. For example, the first main thruster T1 can receive power from the first and second AFE power converters 8a, 10a leaving the third and fourth AFE power converters 8b, 10b to supply power to the first maneuvering thruster T3 or vice versa. The thrusters T1-T4 are connected to the associated AFE power converters by suitable switching means 26 that can select whether power from the second active rectifier/inverter 16 of each AFE power converter 8, 10 is connected to the main thruster or the maneuvering thruster of each propulsion drive system.

The marine propulsion system of FIG. 4 significantly reduces the cost of power electronics and reduces switchboard size, weight and cost Single point failure conditions are much reduced compared to conventional arrangements with increased fault tolerance since a fault in any of the AFE power converters will not affect both of the ac busbars 2a, 2b. The arrangement makes best use of installed power electronics and is particularly suitable for marine vessels where size and weight are important design considerations.

It will be readily appreciated that in the dual fed AFE arrangements shown in FIGS. 3 and 4 each thruster T1-T4 can be supplied with power from both ac busbars 2a, 2b by means of the associated AFE power converters 8, 10 at any given ratio. The ratio may alter during normal operation of the marine propulsion system or during fault conditions, for example, to utilise the power that is available from the ac busbars 2a, 2b. This provides increased flexibility and redundancy and can be advantageously exploited by a DP system to minimise exhaust emissions from the diesel engines or other prime movers (not shown) as described in more detail below.

SUMMARY OF THE INVENTION

The present invention provides a method of operating a dual fed system comprising: a first busbar; a second busbar; at least one generator connected to the first busbar and having an associated prime mover that produces exhaust emissions; at least one generator connected to the second busbar and having an associated prime mover that produces exhaust emissions; and an electrical load connected to the first busbar by means of a first power converter and to the second busbar by means of a second power converter; the method comprising the steps of selecting a desired level of exhaust emissions from the prime movers and supplying power to the electrical load from the first and second busbars at a ratio that achieves the desired level of exhaust emissions.

The prime movers of a system operated by the method of the present invention may for example comprise a diesel engine or a gas turbine or any other suitable machine.

The method of the present invention is capable of operating any dual fed system that falls within the above definition. The method may operate dual fed systems that operate with either ac or dc current. Advantageously, the method may operate a dual fed system that operates with ac current wherein the first and second busbars are ac busbars and the at least one generator connected to the first busbar and the at least one generator connected to the second busbar are ac generators.

Preferably, the method of the present invention may operate a dual fed system that is a marine propulsion system wherein the electrical load is a propulsion motor (or thruster) of the marine vessel.

Preferably the ratio at which power is provided to the electrical load will minimise exhaust emissions, and in particular nitrogen oxides ($NO_x$) and/or other environmentally damaging pollutants such as carbon dioxide ($CO_2$), for example, while still preferably ensuring that the generators provide sufficient total power output to meet the operating needs of the dual fed system or marine propulsion system. In other words, the desired level of exhaust emissions that is selected might be higher than the theoretical minimum level for any given system if operating the prime movers at the required efficiency means that the generators will not produce sufficient total power output for the proper operation of the fuel fed system or marine vessel propulsion system. The exact aim of the operating method will depend on the specific dual fed system. For example, if the dual fed system is a marine propulsion system and the electrical load is a propulsion motor then the aim will depend on the marine vessel and even for a particular marine vessel this may change depending on its location or operating conditions. For example, the International Maritime Organisation (IMO) has specified restrictions on the emission of nitrogen oxides and from the year 2016 will require stricter controls to be operative in certain control areas when compared to open sea. Some countries already place restrictions or costs on exhaust emissions within their national waters; since 2007 the government of Norway has levied a tax on $NO_x$ emissions from ship propulsion engines greater than 750 kW. The tax amounts to NOK 15 (about USD 2.50) per kg of NOx that is emitted. It can therefore be seen that the operator of a marine vessel may want to select a different level of exhaust emissions depending on whether the marine vessel is located in open sea or in a control area where stricter controls apply. In some situations then the desired level of exhaust emissions that is selected can be higher than the achievable minimum level for the marine propulsion system if that is sufficient to meet any national or international obligations or requirements so that tax payments are avoided. In other situations the desired level of exhaust emissions can be selected to try and minimise operating costs, taking into account fuel costs and tax payments, for example. As noted above, the general desire to reduce exhaust emissions for environmental reasons will sometimes have to be balanced against other operational needs of the marine vessel such as output power.

The desired level of exhaust emissions can be selected by an operator or determined automatically, e.g. by a management system running an appropriate algorithm which can optionally also determine the appropriate loading between the generators and/or busbars to achieve the desired emissions level. If the dual fed system is a marine propulsion system the management system may be a vessel management system.

A dual fed marine propulsion system makes it possible to optimise thrust allocation between propulsion motors in a way that is similar to that used in conventional dynamic positioning (DP) systems and then share or allocate the required power between generators to minimise exhaust emissions. More particularly, if a dual fed marine propulsion system includes a plurality of propulsion motors then the method may further comprise the steps of selecting a desired total power usage and allocating a thrust demand between the propulsion motors to achieve the desired total power usage. Preferably the thrust demand will be allocated to minimise total power usage. The thrust demand is typically provided by a controller of a DP system.

Similarly, if the system being operated by the method of the present invention is any other dual fed system that includes a plurality of electrical loads then the method may further comprise the steps of selecting a desired total power usage and allocating an output demand between the electrical loads to achieve the desired total power usage. Preferably, the output demand will be allocated to minimise total power usage.

Power is preferably supplied to the electrical load according to a power allocation algorithm in way that achieves the desired emissions level. The power allocation algorithm may be based on closed-loop control that uses a 'real-time' measurement of the exhaust emissions (i.e. the measured level of nitrogen oxides, carbon dioxide or other pollutants) from at least one of the prime movers as a feedback. The power allocation algorithm may also use a 'real time' measurement of a secondary indication such as the temperature of the exhaust gases produced by at least one of the prime movers.

The allocation of power may use optimisation algorithms such as linear programming, quadratic programming, gradient-based searching, genetic algorithms or any constrained or unconstrained optimisation algorithm. The optimisation algorithm may include a 'cost function' that it tries to minimise.

The dual fed system may have any convenient number of busbars and is not limited to a dual fed arrangement. Each electrical load will typically be connected to each busbar by a power converter but if there are three or more busbars then it will be readily appreciated that a number of different arrangements are possible. If the system is a dual fed marine propulsion system, these arrangements can also be advantageously exploited by a DP system of the marine vessel with the ratio at which power is supplied to each propulsion motor being determined appropriately for a marine propulsion system with three or more busbars.

The power converters are preferably 'active front end' (AFE) power converters.

Once the allocated output demand for a particular electrical load has been determined then it can be supplied with power from one or more of the busbars by means of the associated power converters at any appropriate ratio according to the power allocation algorithm. This means that some generators can be loaded up while other generators are unloaded with the aim of achieving the desired emissions level that has been selected (e.g. minimising total exhaust emissions from all prime movers). Determining the appropriate ratio for the supply of power to each electrical load can be done based on predicted exhaust emissions as a function of generator output power with the option of measured feedback as mentioned above.

Each busbar can be divided into individual sections, with each section being connected to at least one generator. Individual busbar sections can be interconnected by a tie. Electrical loads connected to different individual sections of each busbar can be supplied with power at different ratios. All connections to the busbars and between the individual busbar sections may include protective switchgear or other protective circuits for isolation purposes.

The propulsion motor of a dual fed marine propulsion system being operated by a method according to the present invention may be of any suitable type (induction, synchronous etc.) and have any suitable number of phases (three-phase etc). The propulsion motor may be configured with its rotor coaxially inside or outside its stator and may employ any suitable field means (permanent magnet, conventional or superconducting windings etc). A pair of propulsion motors may form part of a dual motor drive using two separate motors that are adapted to drive a common shaft such as propeller shaft. A pair of propulsion motors may also form part of a dual motor drive with the two motors physically built or located in a common housing (e.g. a tandem motor) and adapted to drive a common shaft. It will be readily appreciated that an individual marine vessel may use any particular number and configuration of propulsion motors (and associated power converters) depending on its propulsion requirements.

The propulsion motor may be used to drive a propeller. The propeller may be of any convenient type such as conventional multi-bladed screws, ducted pump jets or cycloidal drive propellers, for example. The propulsion motor may be located within the hull of a marine vessel (i.e. an in-board propulsion motor driving a propeller via a shaft line with a stern gland), in a pod that is suspended below the hull of the marine vessel to provide both propulsion and steering, or coaxially outside the hull of a submarine, for example. The propulsion motor may be a thruster that can be turned to apply thrust in any given direction and is particularly useful for DP applications.

The present invention further provides a dual fed system comprising: a first busbar; a second busbar; at least one generator connected to the first busbar and having an associated prime mover that produces exhaust emissions; at least one generator connected to the second busbar and having an associated prime mover that produces exhaust emissions; an electrical load connected to the first busbar by means of a first power converter and to the second busbar by means of a second power converter; and a management system which selects a desired level of exhaust emissions from the prime movers and controls the dual fed system so that power is supplied to the electrical load from the first and second busbars at a ratio that achieves the desired level of exhaust emissions.

Further details of the dual fed system and its method of operation are as described above.

BRIEF DESCRIPTION OF THE DRAWINGS

Exemplary embodiments of the invention will now be described, with reference to the accompanying drawings in which.

DETAILED DESCRIPTION OF THE PREFERRED EMBODIMENTS

Figure 3:
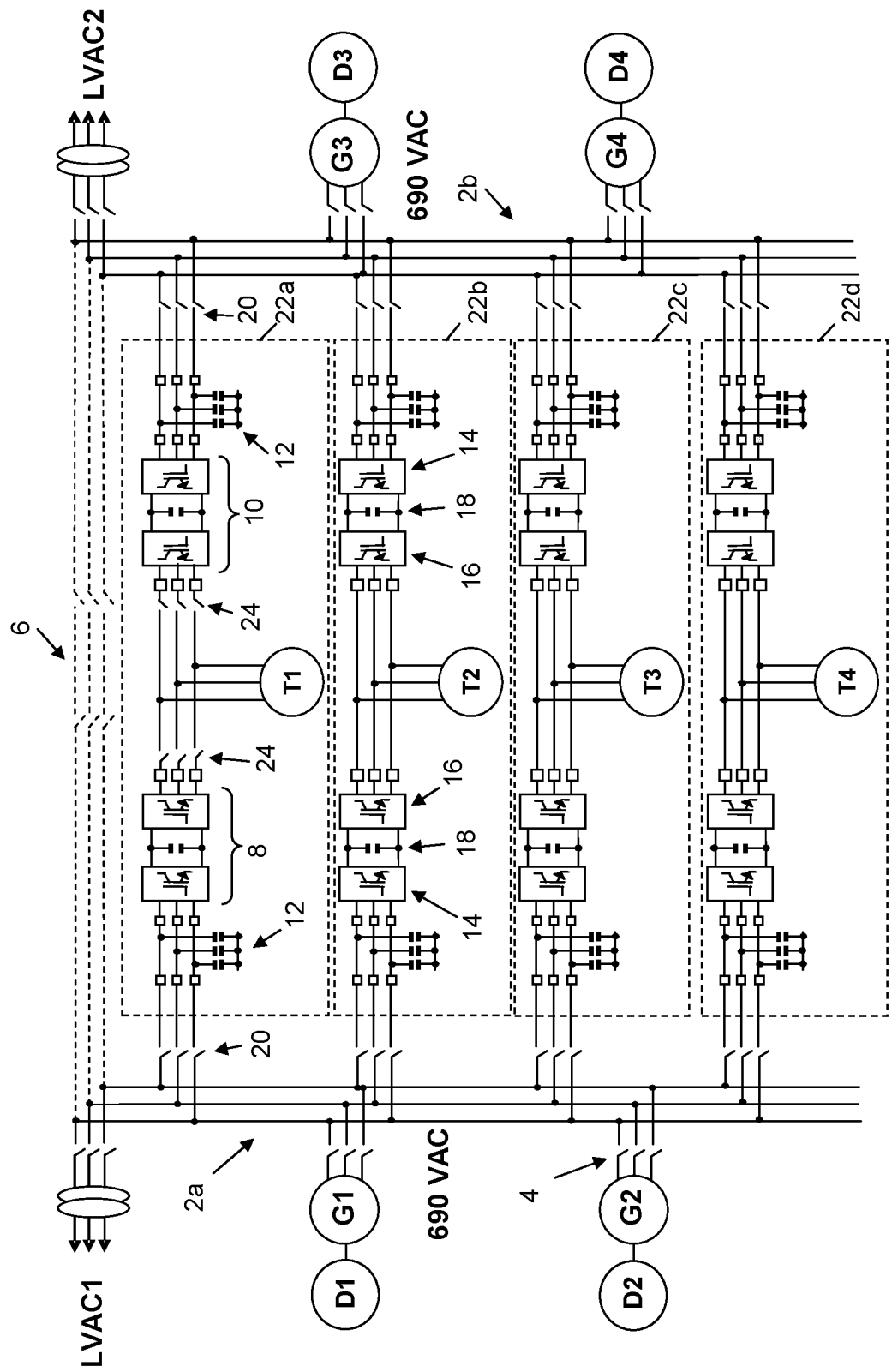
FIG. 3 is a schematic drawing showing a first dual fed marine propulsion system with active front end (AFE) power converters that can be operated according to the method of the present invention.
Figure 4:
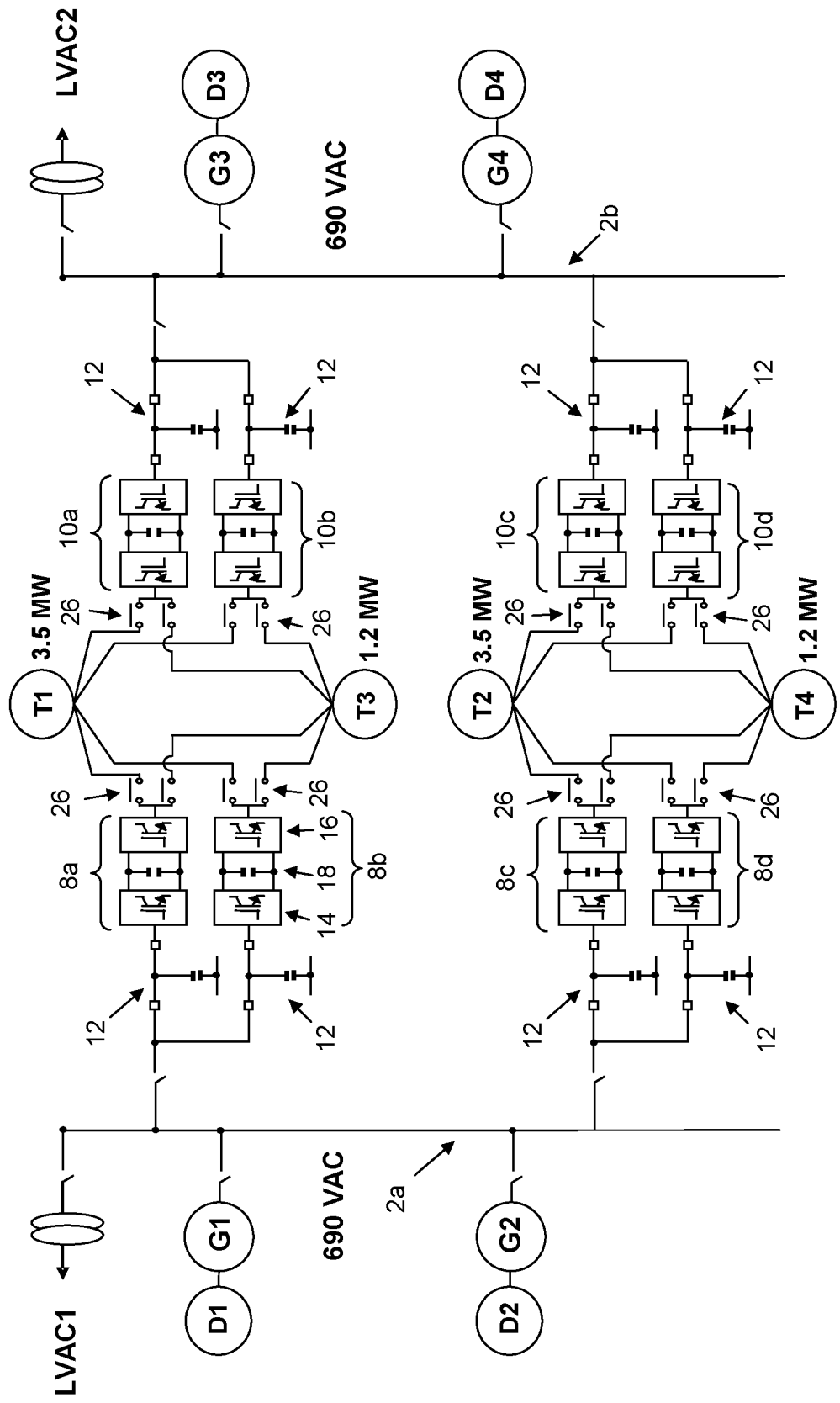
FIG. 4 is a schematic drawing showing a second dual fed marine propulsion system with AFE power converters that can be operated according to the method of the present invention.

The dual fed marine propulsion systems shown in FIGS. 3 and 4 can be controlled according to the method of the present invention to allocate power between the busbars 2a, 2b in a way that minimises the emission of either nitrogen oxides or carbon dioxide, or some combination of the two, for example. In practice the power allocation that achieves a minimum output of nitrogen oxides is unlikely to be the same as the power allocation that achieves a minimum output of carbon dioxide so it will be difficult to minimise both pollutants at the same time. A power allocation that achieves an overall minimum output of all exhaust emissions and other environmental pollutants produced by the diesel engines would, however, be possible.

A power allocation algorithm can calculate an estimate of the nitrogen oxides emissions rate (in units kg/hs for example) for the diesel engines D1-D4 from a set of functions:

$$f_i(P_i), i=1 \ldots N$$

where:
N is the number of generators G1-G4 and coupled diesel engines D1-D4 (i.e. N=4 for the marine propulsion systems shown in FIGS. 1 to 4), and
$P_i$ is the power delivered by generator i.

Another set of functions gives an estimate of the carbon dioxide emissions rate (in units kg/h for example) for the diesel engines D1-D4:

$$g_i(P_i), i=1 \ldots N$$

A typical cost function, Q, is formed from the estimates of emissions for all generators:

$$Q = \sum_{i=1}^{N} (\lambda f_i(P_i) + \mu g_i(P_i)) \tag{EQ1}$$

in which $\lambda$ and $\mu$ are weighting gains to allow the relative importance of the different emission types to be altered. The aim of the optimisation is to find a minimum value for Q whilst observing the following constraint:

$$\sum_{i=1}^{N} P_i = P_{tot} \tag{EQ2}$$

i.e. that the sum of the power provided by the generators G1-G4 equals the total power required by the marine vessel, $P_{tot}$. The total power requirement may be set by a dynamic positioning (DP) system or vessel management system, for example. A DP system may also set thrust demands for the thrusters T1-T4 which can be allocated to achieve minimum total power usage before the power allocation is determined.

The power allocation algorithm can use an alternative cost function, R, which takes into account operating costs for all generators:

$$R = \sum_{i=1}^{N} (\alpha f_i(P_i) + \beta g_i(P_i) + \gamma h_i(P_i)) \quad (EQ3)$$

in which $f_i(P_i)$ and $g_i(P_i)$ are the functions for the nitrogen oxide and carbon dioxide emission rates given above and:

$$h_i(P_i), i=1 \ldots N$$

is another set of functions which gives an estimate of the rate of fuel consumed by the diesel engines D1-D4 (in units kg/h for example).

In this case $\alpha$, $\beta$ and $\gamma$ indicate the cost per kg, i.e. tax payments per kg of nitrogen oxide or carbon dioxide that is emitted, and the fuel cost. Once again the aim of the optimisation is to find a minimum value for R whilst observing the constraint in equation EQ2, i.e. that the sum of the power provided by the generators G1-G4 equals the total power required by the marine vessel, $P_{tot}$. It will be readily appreciated that the cost functions given in equations EQ1 and EQ3 might include other terms such as the emission rates for other pollutants or other costs associated with the normal operation of the diesel engines.

Generators G1-G4 are loaded or unloaded according to the power allocation algorithm so that power is supplied to the thrusters T1-T4 from the first and second busbars 2a, 2b at a particular ratio to minimise exhaust emissions or operating costs, for example.

The decision about how much power to allocate to each ac busbar may be made by a power management system which will typically be part of the vessel management system. The aim point provided by the power management system is achieved by controlling the active front end (AFE) power converters 8, 10 that connect each thruster T1-T4 to the ac busbars 2a, 2b and which can draw power asymmetrically. The power management system will typically need to know what power each thruster T1-T4 requires to achieve its allocated thrust demand and the output power that each generator G1-G4 can supply to the ac busbars 2a, 2b. The distribution voltage of each ac busbar 2a, 2b (e.g. 690 V) will remain constant.

Detailed Example for $NO_x$ Emissions

Figure 5:
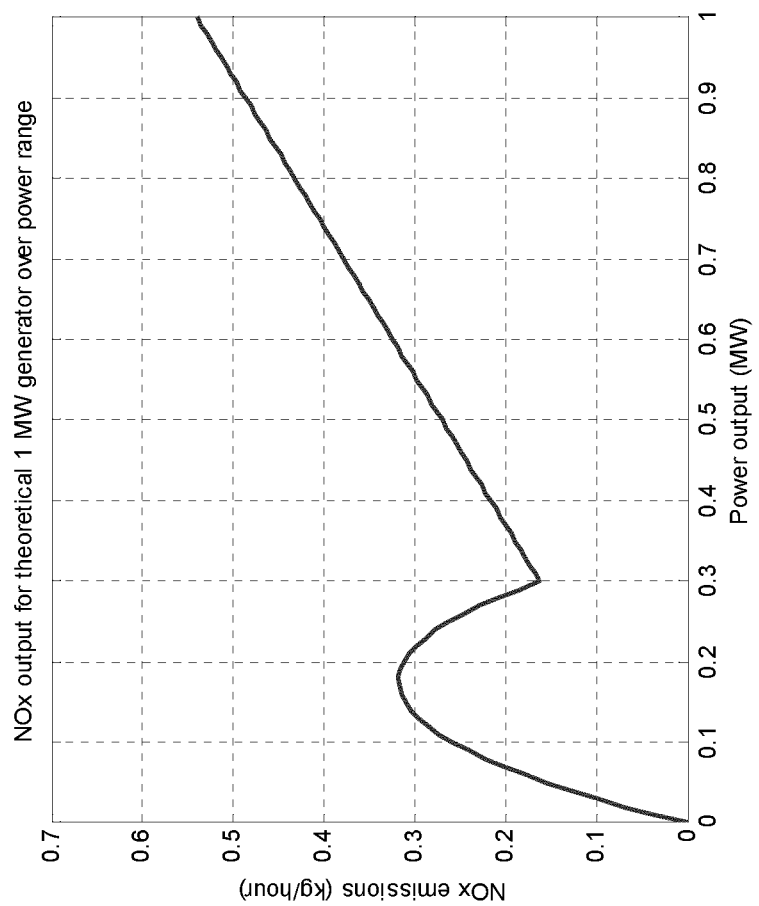
FIG. 5 is an emissions curve showing how the emission of nitrogen oxides ($NO_x$) from a theoretical diesel engine varies with generator output power.

More detailed examples of how the power allocation algorithm might minimise the emission of nitrogen oxides ($NO_x$) from the diesel engines D1-D4 of a marine propulsion system will now be described with particular reference to FIG. 5. The examples are limited to $NO_x$ although similar, corresponding, examples could also be provided for the emission of carbon dioxide ($CO_2$) or other environmentally harmful pollutants present in the exhaust gases of the diesel engines.

For the purpose of these detailed examples then in EQ1 $\lambda=1$ and $\mu=0$.

Each diesel engine D1-D4 is coupled to an ac generator G1-G4 and includes a selective catalytic reducer (SCR) to clean $NO_x$ emissions from its exhaust gases. Each generator G1-G4 is assumed to have a rated power of 1 MW. For an output power that exceeds about 30% of the rated power (i.e. where the output power of the generator is greater than about 0.3 MW) then each diesel engine will emit $NO_x$ according to a linear characteristic with increasing output power and the SCR will reduce the emission of $NO_x$ by a fixed proportion, e.g. 85%. However, at an output power that is less than about 30% of the rated power (i.e. where the output power of the generator is less then about 0.3 MW) then a proportion of the exhaust gases will bypass the SCR to avoid "masking" the catalyst. The proportion of gas which bypasses the SCR increases linearly from 0% for an output power that is 30% of rated power to 100% for an output power that is 0% of rated power. FIG. 5 shows graphically in the form of an emissions curve how the $NO_x$ emissions (kg/h) for each diesel engine D1-D4 vary with the output power (MW) of the coupled generator. It can be seen that there is a minimum point in the emissions curve when the output power is 30% of the rated power which is when substantially all of the exhaust gases pass through the SCR.

The functions $f_i(P_i)$, i=1 ... N that are used by the power allocation algorithm are effectively defined by the emissions curve of FIG. 5.

Each thruster T1-T4 is assumed to have a rated thrust of 100 kN thrust and have a rated power of 1 MW.

Although it is assumed for the purpose of the following detailed examples that the diesel engines, generators and thrusters are identical, it will be readily appreciated that each diesel engine, generator and thruster may be different and therefore have different emission curves, rated power and rated thrust.

If the controller of the DP system requests a total thrust of 123 kN then the total rate of $NO_x$ emissions for all four diesel engines D1-D4 can be calculated for three different examples, namely: (1) a prior art marine propulsion system where power is shared evenly across all four generators G1-G4, (2) the prior art marine propulsion system shown in FIG. 1 where power is shifted from one busbar to another by altering the thrust requested from each thruster T1-T4, and (3) the improved dual fed marine propulsion system shown in FIG. 3 where power is allocated to each generator G1-G4 to achieve minimum $NO_x$ emissions according to the power allocation algorithm under the control of a power management system.

Example (1)

Since all of the thrusters T1-T4 have the same rated thrust the minimum power solution for thrust allocation is to request equal thrust from each thruster. Therefore, the required thrust from each thruster T1-T4 to achieve the total thrust of 123 kN is 30.74 kN. It will be readily appreciated that the power P required by a thruster can be expressed as:

$$\frac{P}{P_{rated}} \approx \left(\frac{T}{T_{rated}}\right)^{1.5}$$

where:
$P_{rated}$ is the rated power,
T is the required thrust (=30.74 kN), and
$T_{rated}$ is the rated thrust.

The power requested by each thruster T1-T4 in this example is therefore equal to about 0.17 MW with a total power requirement for all four thrusters of about 0.68 MW. If this total power requirement is shared equally between all four generators G1-G4 then each generator will need to output about 0.17 MW. Referring to the emissions curve of FIG.

5 then for an output power of about 0.17 MW each diesel engine D1-D4 will produce $NO_x$ emissions of about 0.32 kg/h.

This gives an emissions total of about 1.28 kg/h for all four diesel engines.

Example (2)

Figure 1:
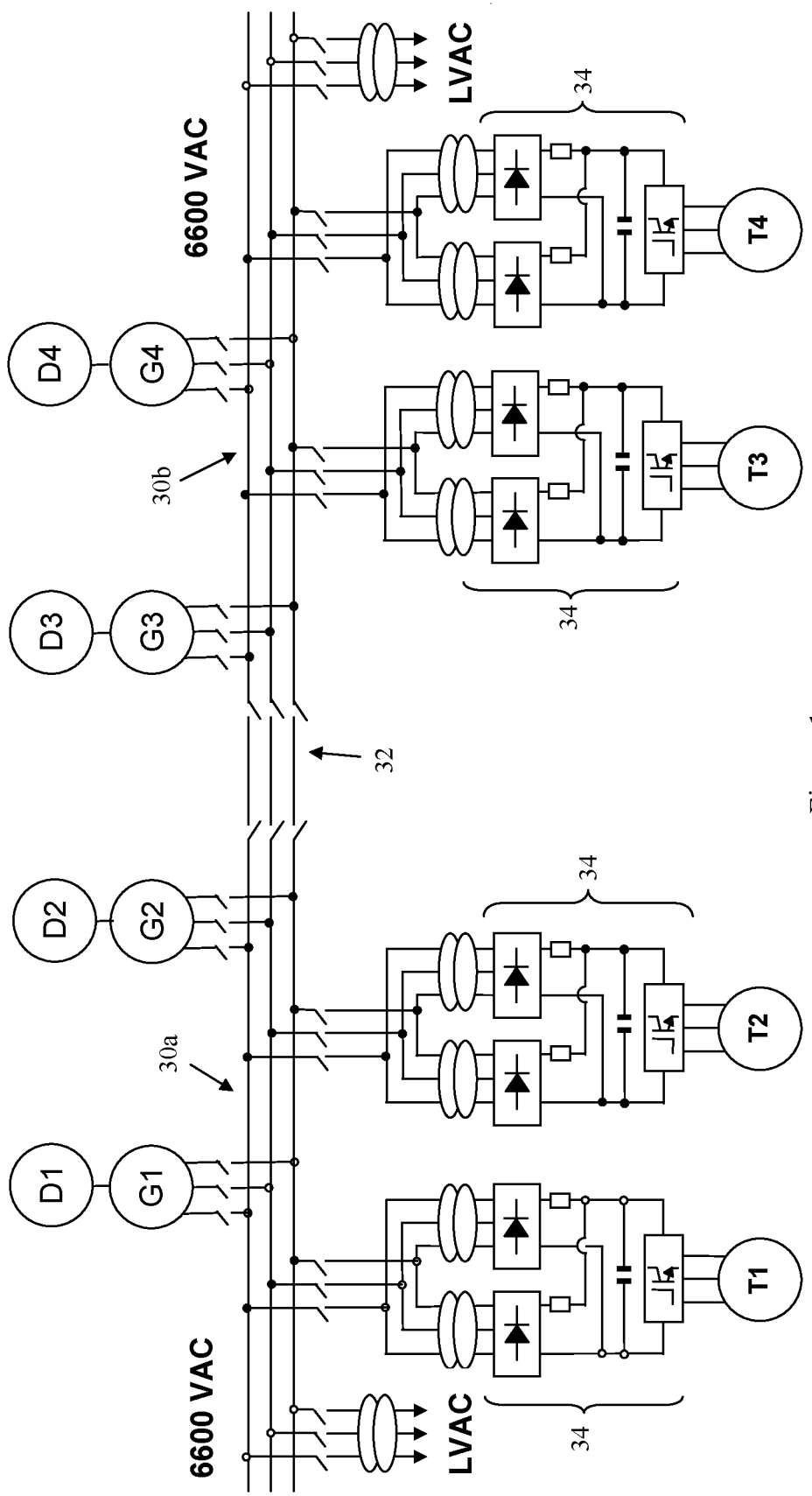
FIG. 1 is a schematic drawing showing a first prior art marine propulsion system with diode front end power converters.
Figure 2:
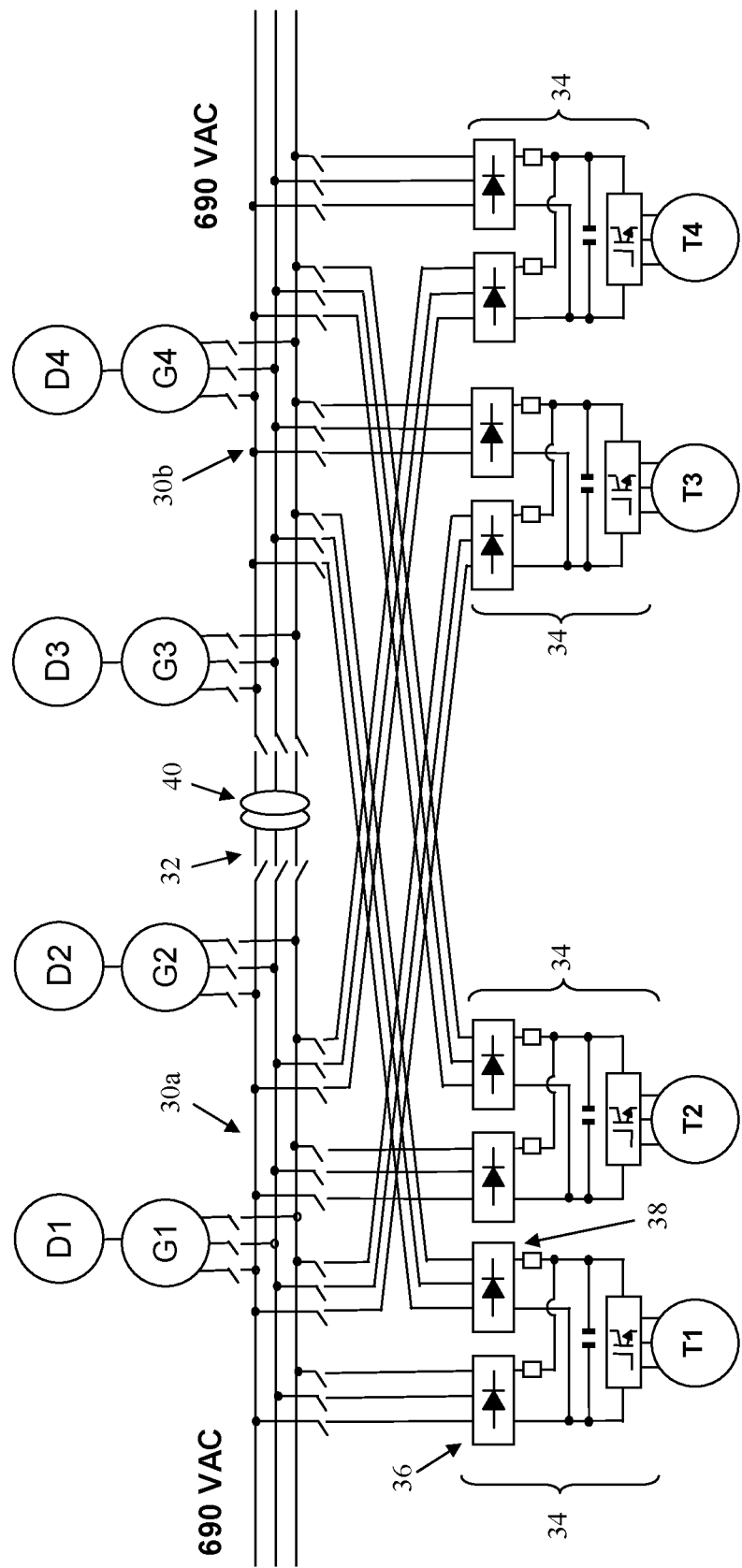
FIG. 2 is a schematic drawing showing a second prior art marine propulsion system with diode front end power converters.

With reference to FIG. 1 it is possible to shift power from one ac busbar to another by altering the allocation of thrust between the thrusters T1-T4. In this example a higher thrust is requested from thrusters T1, T2 in order to minimise $NO_x$ emissions from the diesel engines D1, D2. The required thrust from each of thrusters T1, T2 is set to 44.8 kN which means that the remaining thrusters T3, T4 that are connected to the second ac busbar 30b must each provide 16.7 kN to achieve the total thrust requirement of 123 kN. The total power required by all four thrusters T1-T4 is now about 0.74 MW. Generators G1, G2 must each output about 0.3 MW each and generators G3, G4 must each output about 0.07 MW. Referring to the emissions curve of FIG. 5 then diesel engines D1, D2 will each produce $NO_x$ emissions of about 0.162 kg/h and diesel engines D3, D4 will each produce $NO_x$ emissions of about 0.202 kg/h.

This gives an emissions total of about 0.728 kg/h for all four diesel engines.

Example (3)

The dual fed marine propulsion system shown in FIG. 3 allows the thrust allocation to achieve minimum power, i.e. all four thrusters T1-T4 supply equal thrust of 30.74 kN and request equal power of about 0.17 MW with a total power requirement of about 0.68 MW. The power allocation will minimise $NO_x$ emissions by sharing power between the first and second ac busbars 2a, 2b so that generators G1, G2 each output about 0.3 MW (in other words they operate at the highlighted minimum of the emissions curve) and the remaining two generators G3, G4 each output about 0.04 MW. Referring to FIG. 5 then diesel engines D1, D2 will each produce $NO_x$ emissions of about 0.162 kg/h and diesel engines D3, D4 will each produce $NO_x$ emissions of about 0.127 kg/h.

This gives an emissions total of about 0.578 kg/h for all four diesel engines and represents a significant reduction in $NO_x$ emissions of 21% compared to example (2) and 55% compared to example (1).

What is claimed is:

1. A method of operating a dual fed system comprising a first busbar, a second busbar, (i) at least one generator connected to the first busbar and having an associated prime mover that produces exhaust emissions, at least one generator connected to the second busbar and having an associated prime mover that produces exhaust emissions, and an electrical load connected to the first busbar by means of a first power converter and to the second busbar by means of a second power converter, the method comprising:
   selecting a desired level of exhaust emissions from the prime movers, the selecting including minimizing, according to a power constraint, a cost function formed from estimated nitrogen dioxide and carbon dioxide emission rates of the prime movers; and
   supplying power to the electrical load from the first and second busbars at a ratio that achieves the desired level of exhaust emissions.

2. The method of claim 1, wherein the ratio at which power is supplied to the electrical load from the first and second busbars minimises exhaust from the prime movers.

3. The method of claim 1, wherein the ratio at which power is supplied to the electrical load from the first and second busbars minimises operating costs associated with the prime movers.

4. The method of claim 1, wherein a measurement of the exhaust emissions from at least one prime mover is used to determine the ratio at which power is supplied to the electrical load from one of the first busbar and the second busbar.

5. The method of claim 1, wherein a measurement of the temperature of the exhaust gases produced by at least one prime mover is used to determine the ratio at which power is supplied to the electrical load from one of the first busbar and the second busbar.

6. The method of claim 1, wherein the dual fed system is an ac system, the first and second busbars are ac busbars and the at least one generator connected to the first busbar and the at least one generator connected to the second busbar are ac generators.

7. The method of claim 1, wherein the dual fed system is a marine propulsion system and the electrical load is a propulsion motor.

8. The method of claim 1, wherein the dual fed system includes a plurality of electrical loads, the method further comprising the steps of selecting a desired total power usage and allocating an output demand between the electrical loads to achieve the desired total power usage.

9. The method of claim 8, wherein the output demand is allocated to minimise total power usage.

10. The method of claim 8, wherein the dual fed system is a marine propulsion system, the plurality of electrical loads are a plurality of propulsion motors and the output demand is a thrust demand.

11. The method of claim 10, wherein the thrust demand is provided by a controller of a dynamic positioning (DP) system.

12. The method of claim 1, further comprising determining the estimated nitrogen dioxide and carbon dioxide emission rates of the prime movers.

13. The method of claim 12, wherein the cost function includes a weighted sum of the estimated nitrogen dioxide and carbon dioxide emission rates of the prime movers, and weights of the weighted sum represent relative contributions of different types of emissions.

14. A dual fed system comprising:
   a first busbar;
   a second busbar;
   at least one generator connected to the first busbar and having an associated prime mover that produces exhaust emissions;
   at least one generator connected to the second busbar and having an associated prime mover that produces exhaust emissions;
   an electrical load connected to the first busbar by means of a first power converter and to the second busbar by means of a second power converter; and
   a management system which (i) selects a desired level of exhaust emissions from the prime movers by minimizing, according to a power constraint, a cost function formed from estimated nitrogen dioxide and carbon dioxide emission rates of the prime movers and (ii) controls the dual fed system so that power is supplied to the electrical load from the first and second busbars at a ratio that achieves the desired level of exhaust emissions.

15. The fuel fed system of claim 14, wherein the first and second busbars are ac busbars and the at least one generator connected to the first busbar and the at least one generator connected to the second busbar are ac generators.

16. The dual fed system of claim 14, wherein the dual fed system is a marine propulsion system and the electrical load is a propulsion motor.

17. The dual fed system of claim 14, wherein the dual fed system includes a plurality of electrical loads, and the management system further selects a desired total power usage and allocates an output demand between the electrical loads to achieve the desired total power usage.

18. The dual fed system of claim 17, wherein the dual fed system is a marine propulsion system, the plurality of electrical loads are a plurality of propulsion motors and the output demand is a thrust demand.

19. The dual fed system of claim 18, wherein the thrust demand is provided by a controller of a dynamic positioning (DP) system.

* * * * *